(12) United States Patent
Thun

(10) Patent No.: US 8,635,684 B2
(45) Date of Patent: Jan. 21, 2014

(54) COMPUTER-IMPLEMENTED METHOD FOR MOBILE AUTHENTICATION AND CORRESPONDING COMPUTER SYSTEM

(75) Inventor: Philipp Thun, Hirschberg (DE)

(73) Assignee: SAP AG, Walldorf (DE)

( * ) Notice: Subject to any disclaimer, the term of this patent is extended or adjusted under 35 U.S.C. 154(b) by 111 days.

(21) Appl. No.: 13/267,725

(22) Filed: Oct. 6, 2011

(65) Prior Publication Data
US 2013/0091559 A1    Apr. 11, 2013

(51) Int. Cl.
*H04L 29/06* (2006.01)
(52) U.S. Cl.
USPC .......................... 726/9; 726/5; 726/7; 726/8
(58) Field of Classification Search
None
See application file for complete search history.

(56) References Cited

U.S. PATENT DOCUMENTS

| | | | |
|---|---|---|---|
| 6,259,909 B1* | 7/2001 | Ratayczak et al. | 455/411 |
| 6,678,731 B1* | 1/2004 | Howard et al. | 709/225 |
| 7,058,180 B2* | 6/2006 | Ferchichi et al. | 380/247 |
| 7,340,525 B1* | 3/2008 | Bhatia et al. | 709/229 |
| 8,509,431 B2* | 8/2013 | Schmidt et al. | 380/44 |
| 2011/0225637 A1* | 9/2011 | Counterman | 726/7 |
| 2011/0287739 A1* | 11/2011 | Cajigas Bringas et al. | 455/410 |

OTHER PUBLICATIONS

Wang et al., A New Secure OpenID Authentication Mechanism Using One-Time Password (OTP), IEEE Sep. 2011.*
Watanabe et al., Federated Authentication Mechanism using Cellular Phone—Collaboration with OpenID, IEEE 2009.*
http://openid.net—for user validation. Oct. 6, 2011.

* cited by examiner

*Primary Examiner* — Minh Dinh
(74) *Attorney, Agent, or Firm* — Fountainhead Law Group PC

(57) ABSTRACT

In one embodiment of the present invention a computerized method includes receiving at a personal-mobile device a first communication, which includes information for requesting user verification for logging into an account of a user, via a computing device. The account is with a service provided by an application server. The method includes starting a personal-authentication application on the personal-mobile device in response to receiving the first communication, and receiving in the personal-authentication application a user verification for confirming logging into the account. The method includes logging into the account via the computing device based on receipt of the user verification. Embodiments of the present invention provide enhanced security for logging into an account that a user may have with a service by providing that a personal-mobile device, such as a mobile telephone, which is personal to a user, is configured as a security token for login to the account.

19 Claims, 7 Drawing Sheets

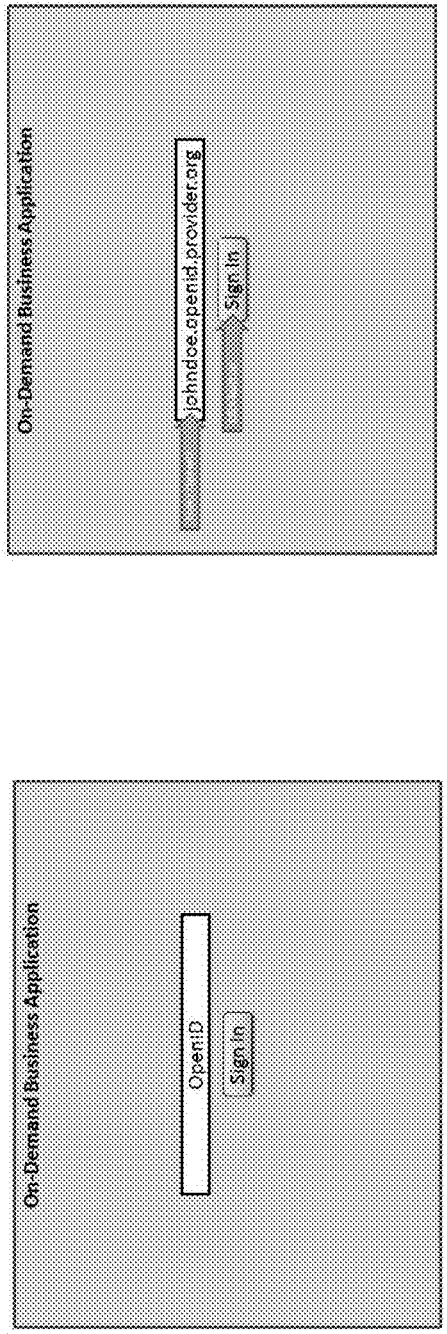
FIG. 8B
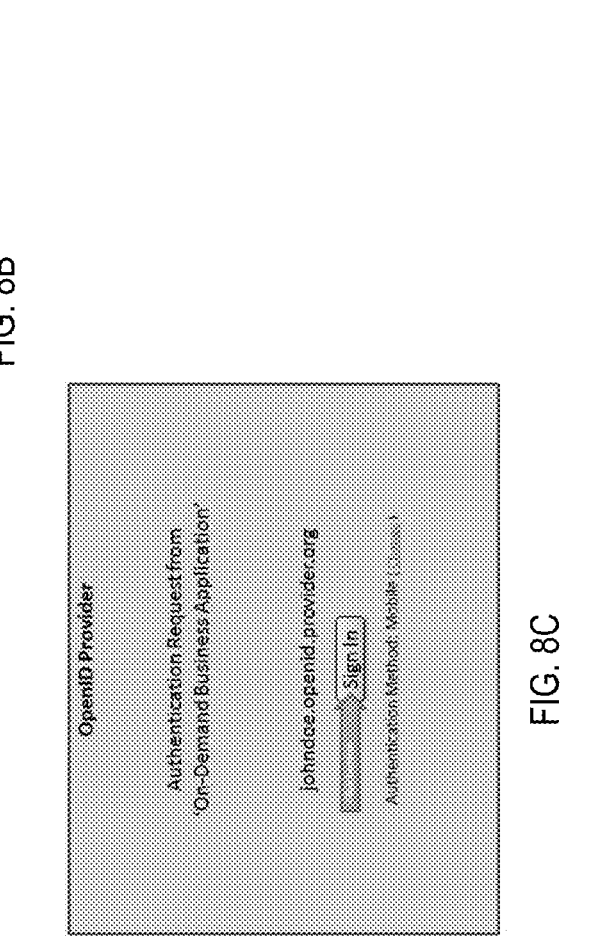
FIG. 8C
FIG. 8A

COMPUTER-IMPLEMENTED METHOD FOR MOBILE AUTHENTICATION AND CORRESPONDING COMPUTER SYSTEM

BACKGROUND

The present invention generally relates to user authentication, and more particularly relates to a computer-implemented method for mobile authentication and a corresponding computer system configured for mobile authentication.

Unless otherwise indicated herein, the approaches described in the background section are not admitted to be prior art by being included in the background section and are not admitted prior art to the claims.

With the growth of the number of services available via the Internet and other networks, the trend of users having multiple accounts with multiple service providers is increasing. For example, a typical user may have a business account with a business service that provides business services for the user's business. The service provider of the business service may provide the same business service or similar business services to a number of users. The business service provider may be SAP AG of Walldorf, Germany, for example, or a different service provider. A typical user may also have one or more e-mail accounts with various e-mail service providers, one or more on-line banking accounts for banking services that are provided by the financial institutions that the user does banking with, a gaming account for gaming service provided by a gaming service provider that provides on-line games, an account for accessing services provided by a user's employer, and the like. Each account for each service provided by each service provider typically requires a user to enter a user identification (ID) and a password on a login webpage to access the account for the service. A login webpage on a computer device is one example user interface typically provided by a service and is often an integral part of the service. Users who have multiple accounts with various services typically have to remember multiple user IDs and multiple passwords for the users' accounts. Remembering a number of user IDs and passwords is often a burden on users. Thus, users often re-use passwords and/or choose simple passwords, which threatens security.

FIGS. 1 and 2 are simplified images of an example login webpage that may be displayed on a computer device that a user may use to access an account for a service, which may be offered via the Internet or another network. The login webpage may prompt the user to enter a user ID and a password. See FIG. 1. A user would typically enter her user ID and her password via a keyboard of the computer device. See FIG. 2. If the computer device successfully logs into an account for a service, the service (e.g., via a server) will typically serve a webpage to the computer device indicating that the computer device has successfully logged into the account. FIG. 3 is a simplified image of a webpage that indicates that the computer device has successfully logged into the user's account for the service.

In addition to problems with users not remembering user IDs and passwords for the users' numerous accounts, users and service providers face problems associated with user IDs and passwords being stolen and a fraudulent user gaining access to users' accounts. One relatively recent solution for providing improved security for users' logging into the users' accounts includes "identity providers" that authenticate the identity of a user to the user's accounts on the Internet or the like. Authentication information for a user may include the user's login credentials, which may include the user's user ID and password for the user's account. Via an identity-provider account, the user does not use her computer device to enter the user's user ID and password on the login webpage for the user's account. The user may enter a user ID on the login webpage for the user's account where the user ID uniquely identifies the user to the identity provider, which thereafter authenticates the user's identity for the user's account and logs the user's computer device into the user's account. The user may have an identity-provider account with the identity provider and may use her computer device to login to the identity-provider account with the identity provider to manage the user's user ID and user password for the identity-provider account and connections to the user's other user accounts (e.g., business accounts, banking accounts, gaming accounts, etc.). While the foregoing describes one process by which an identity provider may provide for a user to log her computer device into a user account, similar processes are provided by other identity providers.

As briefly described above, by using an identity-provider account with an identity provider, a user does not have to enter her user ID and password into a login webpage for logging into her user accounts, but enters a user ID that is shared by the account provider with identity provider, which authenticates the user to the account provider for login. Via the use of an identity-provider account, a user is provided with one less opportunity for her user IDs and passwords for her user accounts to be stolen. Identity providers may offer identity-provider accounts that conform to a variety of standards, such as the OpenID™ standard provided by the OpenID™ Foundation. While identity providers provide for reduced opportunity for having user IDs and passwords stolen, if a user's user ID and password for the user's identity-provider account is stolen, a user's identity on the Internet or other network may still be compromised.

Therefore, new computerized methods and new computer systems are needed to provide additional layers of security for users to log their computer devices into their user accounts via the Internet, an intranet, or the like. Embodiments of the present invention solves these problems as well as other problems by providing a computer-implemented method for mobile authentication and a corresponding computer system configured to execute the computer-implemented method for mobile authentication.

SUMMARY

Embodiments of the present invention improve computer-implemented methods and computer systems for authenticating a user for accessing an on-line account of the user. In one embodiment of the present invention a computerized method includes receiving at a personal-mobile device a first communication, which includes information for requesting user verification for logging into an account of a user, via a computing device. The account is with a service provided by an application server. The method further includes starting a personal-authentication application on the personal-mobile device in response to receiving the first communication, and receiving in the personal-authentication application a user verification for confirming logging into the account. The method further includes logging into the account via the computing device based on receipt of the user verification.

According to one specific embodiment, the method further includes displaying by the personal-authentication application on the personal-mobile device a login-user interface configured to accept user-verification information for the user verification for logging into the account. The step of receiving in the personal-authentication application the user verification includes receiving in the login-user interface the user-verification information for confirming logging into the account via the computing device. The user-verification information includes a user ID for the user of the personal-mobile device. According to another specific embodiment, the step of receiving in the personal-authentication application the user verification includes receiving from a personal-smart card a unique identifier from the personal-smart card for confirming logging into the account via the computing device.

According to another specific embodiment, the method further includes transmitting an authentication communication from the personal-mobile device to a personal-identity server, wherein the authentication communication includes user-verification information for the user verification for logging into the account. The method may further include verifying as authentic at the personal-identity server an identity of the user, if a credential in the user-verification information matches a credential in a personal-identity account of the user held with the personal-identity server. The method may further include transmitting from the personal-identity server to the application server a login credential for logging into the account, if the user is verified as authentic. The user-verification information may include a user ID for the user.

According to another specific embodiment, the method further includes receiving via a login webpage on the computing device a login request for the account; and transmitting an authentication request from the application server to the personal-identity server to verify identity of the user for logging into the account. The step of receiving at the personal-mobile device the first communication, may include receiving the first communication from a personal-identity server at the personal-mobile device. The step of receiving at the personal-mobile device the first communication, may include receiving the first communication from the personal-identity server through a messaging-service server at the personal-mobile device.

According to another embodiment of the present invention, a computerized method for mobile authentication includes receiving at a personal-identity server an authentication request from an application server for user login to an account for a service provided by the application server. The user login to the account is via a computing device. The method further includes transmitting from the personal-identity server to a personal-mobile device a request for user verification for the user login into the account; and receiving at the personal-identity server an authentication communication from the personal-mobile device. The authentication communication includes user-verification information of the user entered in or stored on the personal-mobile device. The method further includes verifying as authentic at the personal-identity server an identity of the user based on the user-verification information, if a credential in the user-verification information matches a credential in a personal-identity account of the user held with the personal-identity server; and transmitting from the personal-identity server to the application server a login credential for the user login to the account if the user is verified as authentic.

According to one specific embodiment, the method further includes receiving at the personal-mobile device the request for the user verification for the user login to the account; starting a personal-authentication application on the personal-mobile device in response to receiving the request; receiving in the personal-authentication application a user verification for confirming the user login to the account; and transmitting from the personal-mobile device to the personal-identity server the authentication communication in response to receipt of the user verification in the personal-authentication application. The method may include logging into the account via the computing device based on receipt of the login credential in the application server. The method may further include displaying by the personal-authentication application on the personal-mobile device a login-user interface configured to accept information for receiving user verification for logging into the account via the computing device; receiving in the login-user interface a user verification for confirming logging into the account via the computing device; and logging into the account via the computing device based on receipt of the user verification in the login-user interface.

According to another specific embodiment, the method further includes receiving from a personal-smart card a unique identifier from the personal-smart card for confirming logging into the account via the computing device. The method may further include receiving in the login-user interface the user-verification information for confirming logging into the account via the computing device. The user-verification information includes a user ID for the user of the personal-mobile device.

According to another embodiment of the present invention, a computer system configured to login to an account for a network-provided service includes a computing device configured for login to an account for a service; an application server configured to provide the service for the account to the computing device across a network; and a personal-mobile device configured as a security token for login to the account. The computer system further includes a personal-identity server configured to: i) receive an authentication request from an application server for user login to the account; ii) transmit to a personal-mobile device a request for user verification for the login to the account; iii) receiving an authentication communication from the personal-mobile device wherein the authentication communication includes user-verification information of the user entered in or stored on the personal-mobile device; iv) verify as authentic an identity of the user based on the user-verification information, if a credential in the user-verification information matches a credential in a personal-identity account of the user held with the personal-identity server; and v) transmit to the application server a login credential for the user login to the account if the user is verified as authentic. The application server is configured to login the computing device to the account based on receipt of the login credential.

According to specific embodiment the computer system further includes a messaging-service server configured to relay the request for the user verification from the personal-identity server to the personal-mobile device. The personal-mobile device may be a mobile telephone.

The following detailed description and accompanying drawings provide a better understanding of the nature and advantages of the present invention.

BRIEF DESCRIPTION OF THE DRAWINGS

FIG. 8A is a simplified image of an example login webpage that may be served to the computer by the application server;

FIG. 8B is a simplified image of a webpage that shows the user ID entered in a login box on the login webpage;

FIG. 8C is a simplified image of a webpage served by the identity server after the user has been re-directed from the application server that indicates that the user ID is being verified and showing the user's default authentication method;

DETAILED DESCRIPTION

Described herein are a computerized method and a computer system for mobile authentication. In the following detailed description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
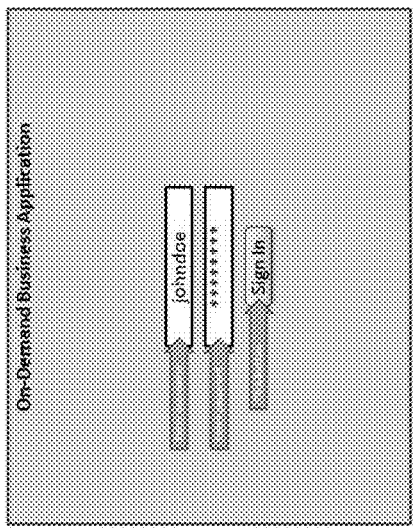
FIGS. 1 and 2 are simplified images of an example login webpage that may be displayed on a computer device that a user may use to access an account for a service.
Figure 2:
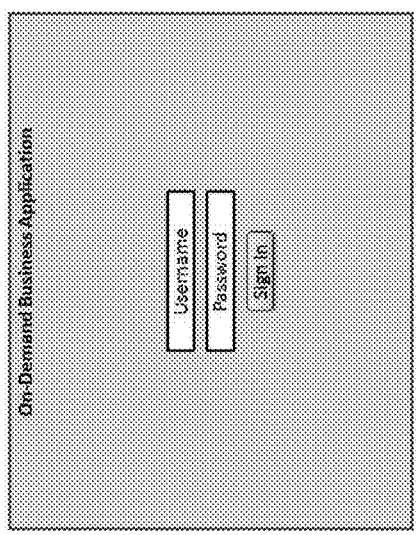
Figure 3:
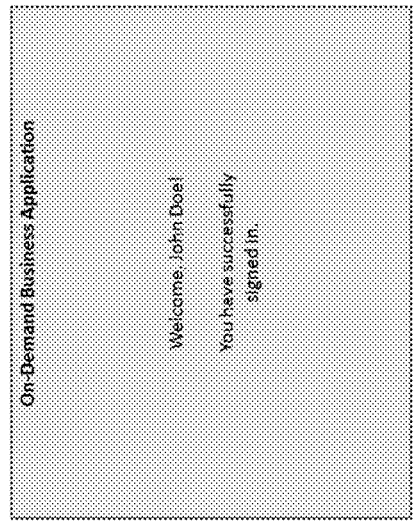
FIG. 3 is a simplified image of a webpage that indicates that the computer device has successfully logged into the user's account for the service.
Figure 4:
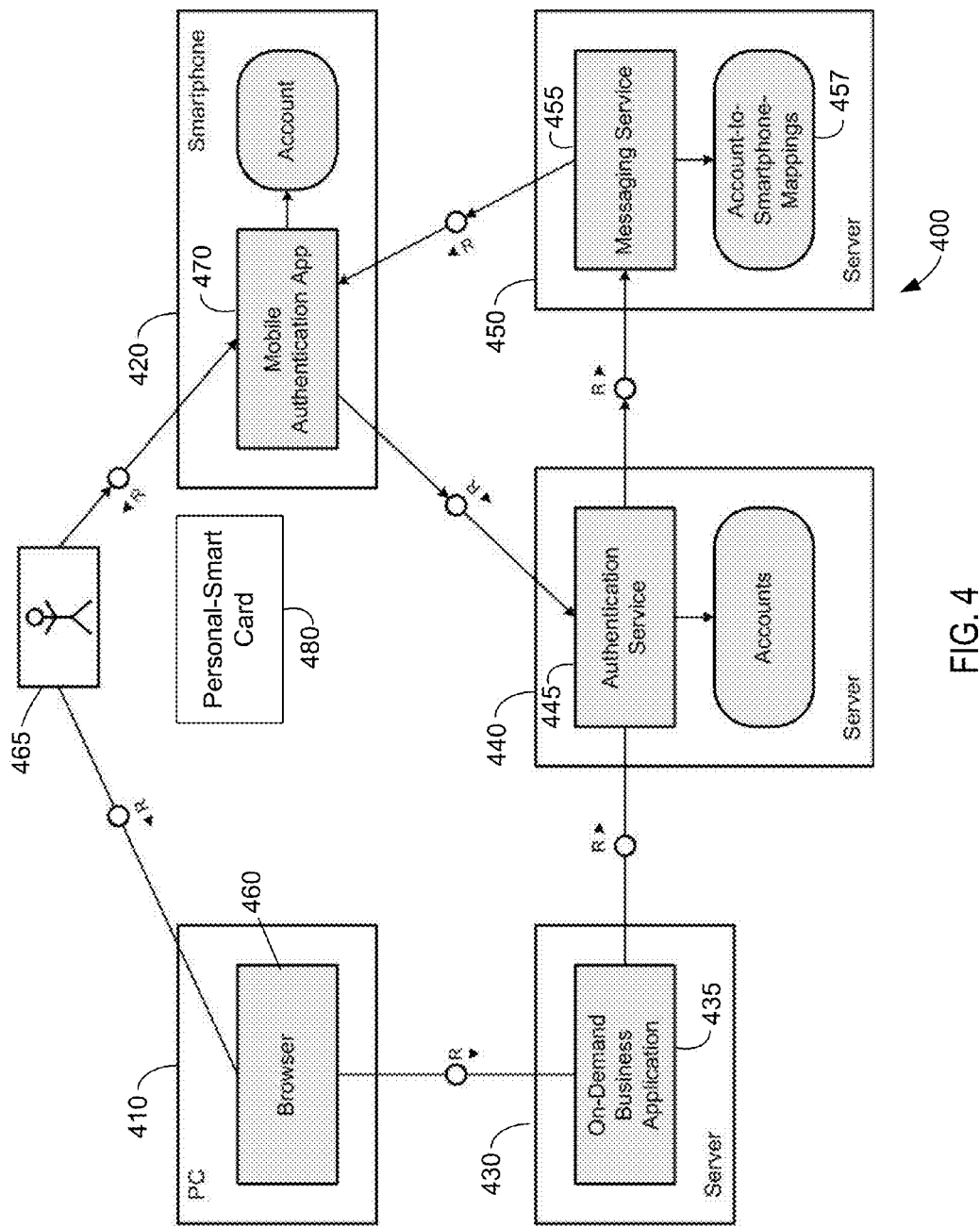
FIG. 4 is a simplified schematic of a computer system according to one embodiment of the present invention.

FIG. 4 is a simplified schematic of a computer system 400 according to one embodiment of the present invention. Computer system 400 includes a computer 410, a personal-mobile device 420, an application server 430, a personal-identity server 440, and a messaging-service server 450. Computer 410, personal-mobile device 420, application server 430, personal-identity server 440, and messaging-service server 450 may be configured to communicate via network connections, such as Internet connections, mobile telephone connections, or the like. Computer 410 may be configured to run a browser application 460 for accessing network content (e.g., Internet content). Computer 410 may be one of a variety of computer devices that is configured to run browser application 460 as well as other applications. Computer 410 may be a personal computer (e.g., a desktop computer, a laptop computer, etc.), a tablet computer (e.g., an iPad™), a server computer, a mobile device (e.g., an iPod™), or the like. Computer 410 may include a processor and a memory device, which is configured to store computer code operable on the processor. The memory device may include a hard drive, an optical drive with an optical memory, a semiconductor memory, or the like. The memory device may be a non-transitory memory device. Computer 410 may also include a computer monitor and one or more control devices (e.g., a keyboard, a mouse, etc.) for controlling the computer.

Personal-mobile device 420 is personal to a user 465. That is, the personal-mobile device is a device that is typically under the exclusive control of the user regardless of whether the user owns the personal-mobile device. Further, the personal-mobile device is a device that a user can typically carry with them. For example, the personal-mobile device may be a mobile telephone (such as a smartphone), an iPod™ or an iPod™ like device, a personal digital assistant (PDA), or the like, and may include a processor and/or a controller (e.g., a microcontroller). The personal-mobile device may also include a memory for storing computer code that is operable on the personal-mobile device's processor. The computer code may be for applications, which are configured to operate on the personal-mobile device. For example, the computer code may be for a smartphone application operable on a smartphone. An application may be loaded onto the personal-mobile device via a variety of methods, such as loading the application onto the personal-mobile device via a network download (e.g., an Internet download from a server), loading the application via a local memory, such as a semiconductor memory, loading the application via computer 410, or the like.

Each of the servers 430, 440, and 450 may be server computers configured to operate server software. Each of the servers may include a processor and a memory device configured to store computer code operable on the processor. The memory devices may be hard drives, optical drives with optical memories, semiconductor memories, or the like. The memory devices may be non-transitory memory devices. Each of the servers may also include a computer monitor and one or more control devices (e.g., a keyboard, a mouse, etc.) for controlling the servers. While each of the servers is shown in FIG. 4 as a single server computer, one or more of the servers may include a plurality of server computers, which may reside at a server farm or may be geographically distributed, such as distributed nationally or distributed internationally.

According to one embodiment of the present invention, application server 430 is configured to provide a service 435 for the user via computer 410. The user may have an account on application server 430 for the service. The service may be a business service (e.g., a business service provided by SAP AG of Walldorf, Germany), a banking service, a gaming service, a service by which the user can manage another service (e.g., an online service where a user can manage the user's mobile telephone service), an e-mail service, etc. Application server 430 and computer 410 may be configured to communicate across a network, such as the Internet, an intranet, or a combination thereof. In FIG. 4, the lines linking the servers, the computer, and the personal-mobile device may represent network connections on the Internet. The line linking messaging-service server 450 and personal-mobile device 420 may represent a combination of a cellular telephone link and a network link.

According to a further embodiment of the present invention, personal-identity server 440 is configured to authenticate an identity of a user to application server 430. The personal-identity server may be configured to store and operate an authentication service 445, which is configured to authenticate the identity of the user. More specifically, the personal-identity server is configured to authenticate the user to the application server where the user is using computer 410 to login to the user's account, which is held with the application server. The personal-identity server may be configured to send authentication information for the user to the application server so that the user, via computer 410, may login to the user's account on the application server. The authentication information may be a signed token. The authentication information may be used by the application server to log the user, via computer 410, into the user's account. After the user, via computer 410, logs into the user's account the user may then use the services for which the user has an account. Authentication of a user is described in further detail below.

The personal-identity server may be configured to store authentication information for a plurality of users where each user is assigned unique authentication information that identifies the user. The personal-identity server may be configured to establish personal-identity accounts for the plurality of users where each user provides relevant-personal information to the personal-identity server to establish a personal-identity account. Each user has (typically) one single personal-identity account with the personal-identity server and all of the user's accounts with other services provided by other servers (e.g., application server 430, etc.) are linked to the personal-identity account. Each user may be assigned a user ID and password for logging into the user's personal-identity account. After a user (e.g., via computer 410) has logged into the user's personal-identity account, the personal-identity server is configured to provide webpages to computer 410 via which the user may make modification to the user's personal-identity account as will be well understood by those of skill in the art.

According to one embodiment, the personal-identity server is configured to "register" a user's personal-mobile device with the personal-identity server. Registration of the personal-mobile device may include collecting information regarding the personal-mobile device so that the personal-identity server can communicate with the personal-mobile device. Registration of the personal-mobile device may include loading a mobile-authentication application 470 onto the personal-mobile device where the mobile-authentication application is configured to supply information to the personal-identity server where the information may uniquely identify the personal-mobile device to the personal-identity server.

Figure 6:
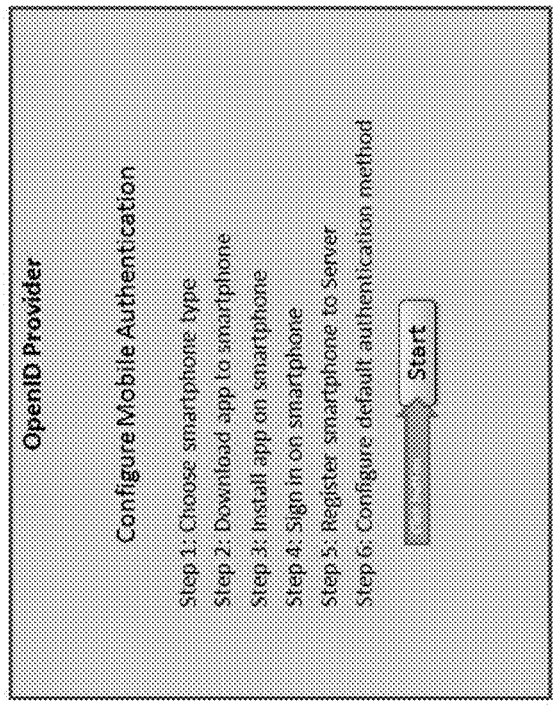
FIG. 6 is a webpage served by the personal-identity server and is configured for collecting information for identifying a "type" of the personal-mobile device and guiding through the process of setting up the personal-mobile device for mobile authentication.
Figure 5:
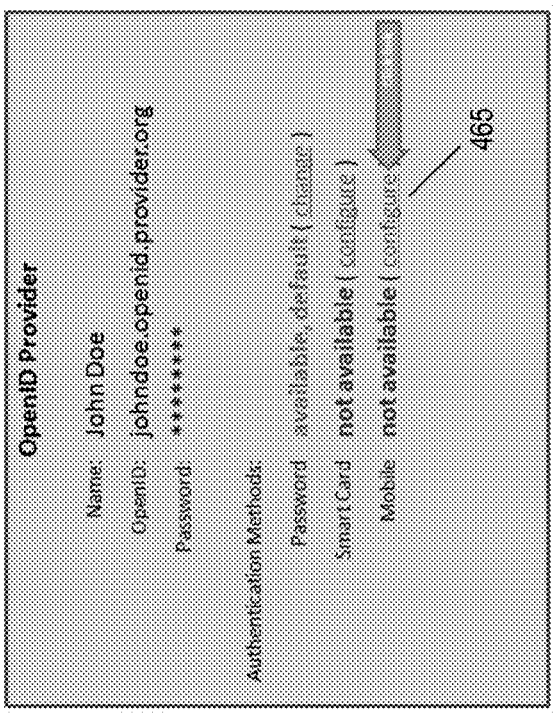
FIG. 5 is a simplified webpage that the personal-identity server may serve to a computer or the like where the webpage includes a screen option for registering the personal-mobile device with the personal-identity server.

FIG. 5 is a simplified webpage that the personal-identity server may serve to computer 410 or the like where the webpage includes a screen option 465 for registering the personal-mobile device with the personal-identity server. The personal-identity server via the webpage may also provide an option for allowing a user to register a user's personal-smart card 480 with the personal-identity server. If screen option 465 is selected for registering the personal-mobile device with the personal-identity server, the personal-identity server may be configured to collect information for registering the personal-mobile device. For example, the personal-identity server may be configured to serve a webpage, see FIG. 6, for collecting information for identifying a "type" of the personal-mobile device. The "type" information for the personal-mobile device may include a manufacturer's name and a model identifier (e.g., model name or model number), and may include a name of a service provider that provides mobile communication services for the personal-mobile device. The service provider may be the mobile telephone company that provides communication services for the personal-mobile device. The personal-mobile device may thereafter be configured to download a mobile-authentication application 470 to computer 410 for installation of the mobile-authentication application in the personal-mobile device. Alternatively, the personal-identity server may be configured to direct another server to download the mobile-authentication application to computer 410 for installation of the mobile-authentication application in the personal-mobile device. For example, the personal-identity server may direct a server for a manufacturer of the personal-mobile device to download the mobile-authentication application to computer 410 for installation of the mobile-authentication application in the personal-mobile device. According to another alternative, the mobile-authentication application may be downloaded to the personal-mobile device via the Internet, for example if the personal-mobile device is web enabled. According to another alternative, the mobile-authentication application may be downloaded to the personal-mobile device via mobile telephone link.

After an initial startup of the mobile-authentication application (for example, by user selection) the mobile-authentication application via a user interface on the personal-mobile device may direct the user to enter the user's user ID and password for the user's personal-identity account with the personal-identity server. The mobile-authentication application, via the personal-mobile device, may be configured to send a communication to the personal-identity server to confirm registration of the personal-mobile device with the personal-identity server. The communication may include the user ID and password. The mobile-authentication application may be configured by the user for specific uses as will be described below.

Figure 7:
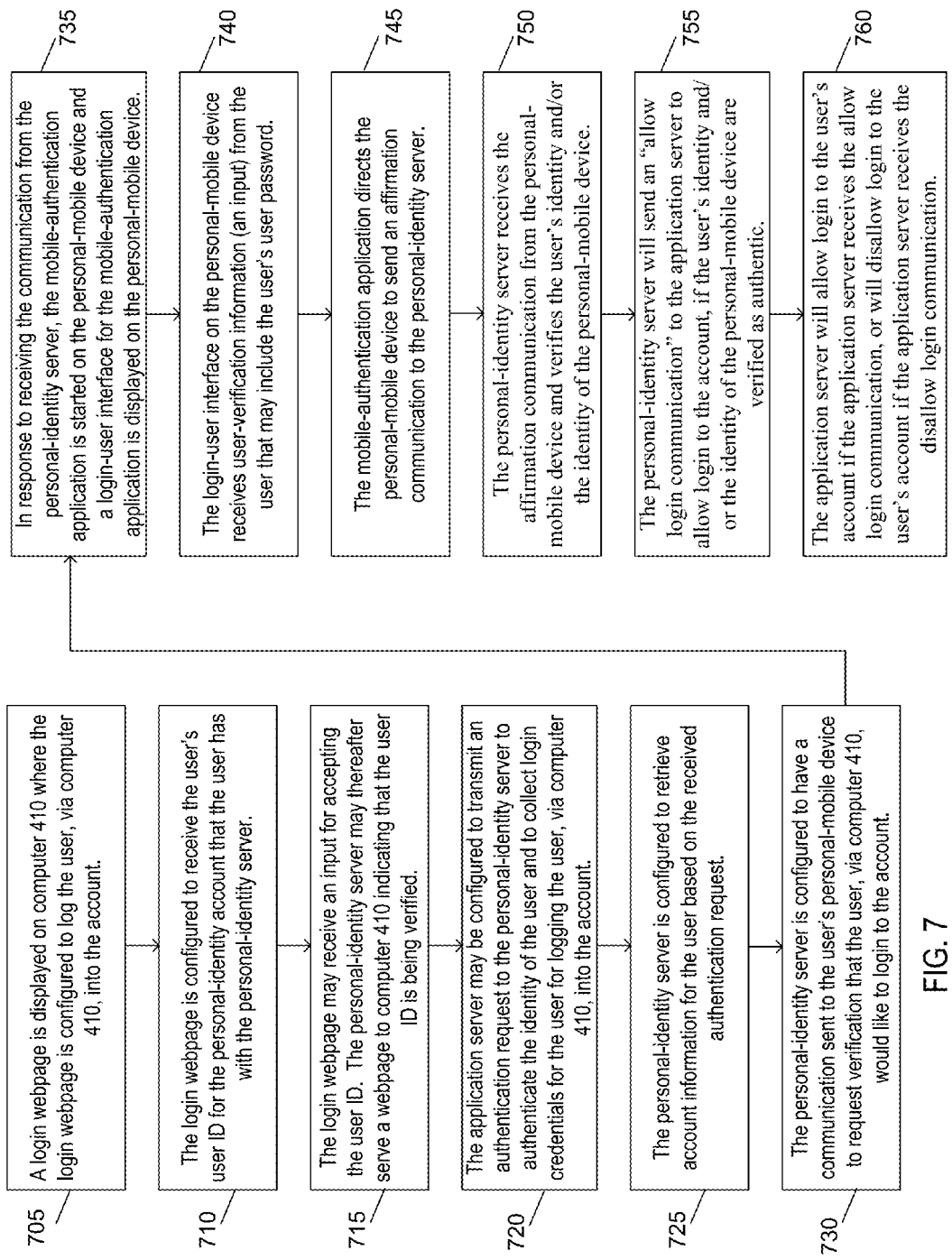
FIG. 7 is a high-level flow chart for a login method for logging into a specific account that a user has with a service provided by the application server where the personal-mobile device is used as a security token for logging into the account.
Figure 8E:
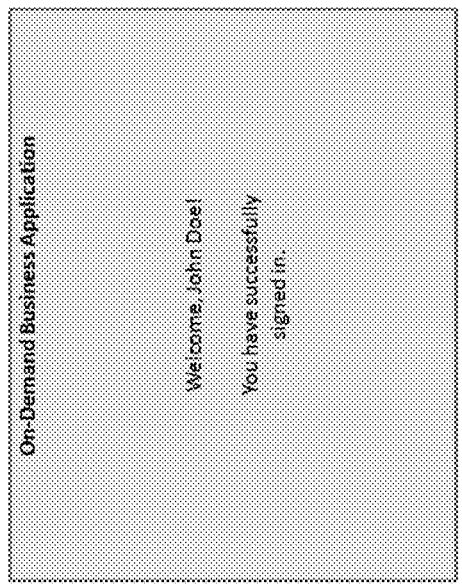
FIG. 8E is an example webpage that may be served to the computer indicating that login to the account was successful.
Figure 8D:
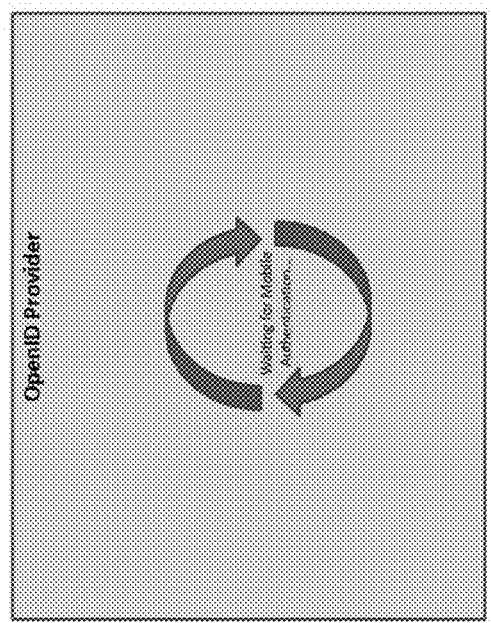
FIG. 8D is a simplified image of a webpage that indicates that the identity server has sent an authentication request to the personal-mobile device and is waiting for a response based on user interaction.

According to one embodiment, after the personal-mobile device is registered with the personal-identity server, the personal-mobile device is configured for use as a "security token" for logging into various accounts of the user via computer 410. The use of the personal-mobile device by computer system 400 as a security token is presently described with respect to FIG. 7. FIG. 7 is a high-level flow chart for a login method for logging into a specific account that a user has with a service provided by the application server where the personal-mobile device is used as a security token for logging into the account. The high-level flow chart is exemplary and various steps of the method may be combined and/or added without deviating from the purview of the described embodiment as will be understood by those of skill in the art. The high-level flow chart is not limiting on the claims. At a step 705, a login webpage is displayed on computer 410 where the login webpage is configured to log the user, via computer 410, into the account. The login webpage may be served to computer 410 by application server 430. The login webpage may be configured to provide an option for collecting login information for the account from the personal-identity server. FIG. 8A is a simplified image of an example login webpage that may be served to computer 410 by application server 430. At a step 710, the login webpage is configured to receive the user's user ID for the personal-identity account that the user has with the personal-identity server. FIG. 8B is a simplified image of a webpage that shows the user ID entered in a login box on the login webpage. The user ID may include information that identifies both the user and the particular personal-identity service provided by the personal-identity server. At a step 715, the login webpage may receive an input for accepting the user ID. The personal-identity server may thereafter serve a webpage to computer 410 indicating that the user ID is being verified. FIG. 8C is a simplified image of a webpage served by the personal-identity server after the user has been re-directed from the application server that indicates that the user ID is being verified and showing the user's default authentication method. FIG. 8D is a simplified image of a webpage that indicates that the identity server has sent an authentication request to the personal-mobile device and is waiting for a response based on user interaction.

At a step 720, the application server may be configured to transmit an authentication request to the personal-identity server to authenticate the identity of the user and to collect login credentials for the user for logging the user, via computer 410, into the account. The authentication request may include the user ID entered in the login webpage. At a step 725, the personal-identity server is configured to retrieve account information for the user based on the received authentication request. At a step 730, the personal-identity server is configured to have a communication sent to the user's personal-mobile device to request verification that the user, via computer 410, would like to login to the account. Because the personal-mobile device has been registered with the personal-identity server, the personal-identity server is able to have the communication sent to the personal-mobile device. The personal-identity server may be configured to direct messaging-service server 450 to send the communication to the personal-mobile device. The messaging-service server may be configured to operate a messaging service 455 that may be configured to access information for a mapping 457 of personal-mobile devices to personal-identity accounts. The communication may be an SMS message or the like directing the user to start the mobile-authentication application on the personal-mobile device. According to one embodiment, the communication (e.g., a push notification) may be configured to start the mobile-authentication application on the personal-mobile device substantially automatically (e.g., via the push notification).

Figure 9:
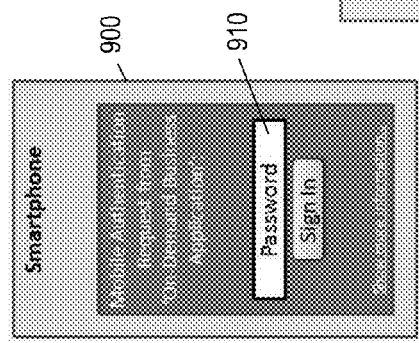
FIG. 9 is a simplified image of a login-user interface that may be displayed for the mobile-authentication application on the personal-mobile device where the login-user interface includes a field in which the user may enter the user's password.

At a step 735, in response to receiving the communication from the personal-identity server, the mobile-authentication application is started on the personal-mobile device and a login-user interface for the mobile-authentication application is displayed on the personal-mobile device. The login-user interface includes a field in which the user is requested to enter the user's password for the user's personal-identity account. FIG. 9 is a simplified image of a login-user interface 900 that may be displayed for the mobile-authentication application on the personal-mobile device where the login-user interface includes a field 910 in which the user may enter the user's password.

The login-user interface for the mobile-authentication application may include identification information that identifies the service provided by the application server. For example, if the application server provides a service for an "On Demand Business Application," identification information that identifies the On Demand Business Application may be displayed on the login-user interface. The mobile-authentication application may also display further information, e.g. IP address of computer 410, type and version of browser 460, etc. Because the user, via computer 410, has requested login to the account held with the application server, providing identification information for the service (e.g., the On Demand Business Application) on the login-user interface shortly after the user has requested login assures the user that a fraudulent user is not trying to fraudulently access the account with the application server. Alternatively, if the user's personal-mobile device displays a login-user interface with identification information for a service the user has not attempted to recently login to, the user will be informed that her user ID has been accessed by a potentially fraudulent user.

At a step 740, the login-user interface on the personal-mobile device receives user-verification information (an input) from the user that may include the user's password. Receipt of an entry of the user-verification information in the login-user interface may be a user verification that the user, via computer 410, would like to login to the account. At a step 745, the mobile-authentication application directs the personal-mobile device to send an affirmation communication to the personal-identity server. The affirmation communication affirms the user's intent to login to the account via computer 410. The affirmation communication may include verification information that indicates that the user has the intent, via computer 410, to login to the application. The affirmation information may include the user's password entered in the login interface of the mobile-authentication application and/or may include identification information that uniquely identifies the personal-mobile device. The affirmation communication may be sent from the personal-mobile device to the personal-identity server via messaging-service server 450 or via another communication path that does not include the messaging-service server. Alternatively, the mobile-authentication application via the personal-mobile device may communicate directly with the personal-identity server to send the affirmation communication.

At a step 750, the personal-identity server receives the affirmation communication from the personal-mobile device and verifies the user's identity and/or the identity of the personal-mobile device. The user identity and/or the identity of the personal-mobile device may be verified as authentic via the verification information (e.g., the user's password) included in the affirmation communication and/or information for the affirmation communication, such as a telephone number or the like of the personal-mobile device. The personal-identity server may verify the user as authentic and/or the personal-mobile device as authentic if the verification information and/or the information for the affirmation communication match similar information stored by the personal-identity sever for the user. At a step 755, the personal-identity server will send an "allow-login communication" to the application server to allow login to the account, if the user's identity and/or the identity of the personal-mobile device are verified as authentic. The allow-login communication may include a signed token. Alternatively, the personal-identity server may send a "disallow login communication" to the application server to disallow login to the account, if the user's identity and/or the identity of the personal-mobile device are not verified as authentic. At a step 760, the application server will allow login to the user's account if the application server receives the allow-login communication, or will disallow login to the user's account if the application server receives the disallow login communication. According to an alternative embodiment, a disallow login communication might not be sent to the application server and the application server may not allow login to the account until an allow-login communication is received by the application server. FIG. 8E is an example webpage that may be served to the computer indicating that login to the account was successful.

According to one embodiment, if the password is not properly entered in the login display on the personal-mobile device at step 740, the mobile-authentication application operating on the personal-mobile device may reject the entry and put an error message on the login-user interface. The error message may indicate that the password entered in the login-user interface is not correct. The mobile-authentication application also might not direct the personal-mobile device to send a communication to the personal-identity server, which may reduce the number of communications processed by the personal-identity server. According to an alternative embodiment of the present invention, if the password is not properly entered on the login-user interface on the personal-mobile device, the mobile-authentication application may direct the personal-mobile device to send a non-authentication communication to the personal-identity server, and the personal-identity server may thereafter not verify as authentic the user identity and/or the identity of the personal-mobile device. The personal-identity server may be configured to send a communication back to the personal-mobile device for the mobile-authentication application to put the error message on the login-user interface. Password verification may be performed on the mobile device or by the identity server where the latter may be preferred due to the possibility that the password might have been changed.

Via entry of the password in the login-user interface of the mobile-authentication application, the user confirms that the user is in control of the user's personal-mobile device and confirms via the personal-mobile device that the user would like to access the account held with the service provided by the application server. Further, via entry of the password in the login-user interface of the mobile-authentication application, an assumption is made by computer system 400 that the user is in control of the personal-mobile device. Based on the assumption of the user being in control of the personal-mobile device, the personal-mobile device provides an added degree of security that the user who holds the account is the user requesting login and is not a fraudulent user. Thereby, the described method and the described computer system provide that the personal-mobile device may serve as a security token for both the user who is accessing her account and the service provider for the account.

Figure 10:
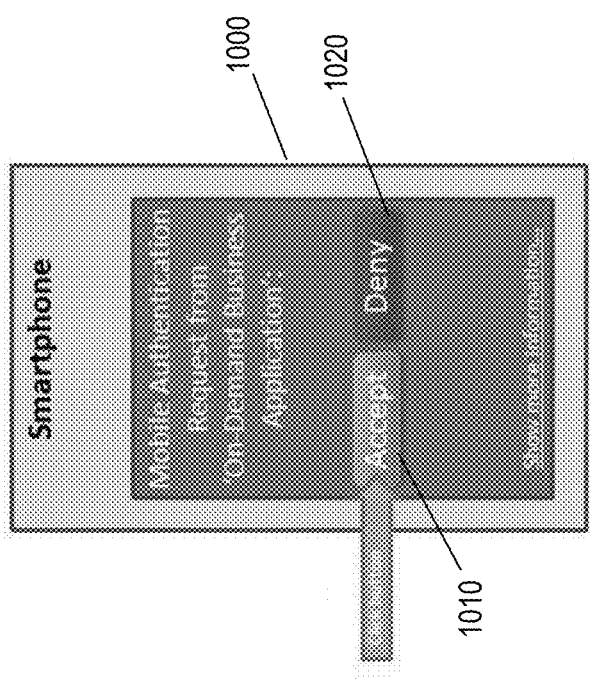
FIG. 10 is a simplified image of an example login-user interface that may be displayed on the personal-mobile device where the login-user interface includes an accept user-selectable (e.g., a soft button operable on a touch interface of the personal-mobile device) and a deny user-selectable option (e.g., another soft button).

According to an alternative embodiment, the mobile-authentication application at step 735 provides an alternative login method to the account. The mobile-authentication application may be configured to provide an "accept" user-selectable option and a "deny" user-selectable option on the login-user interface on personal-mobile device so that the user may accept or deny login to the account. FIG. 10 is a simplified image of an example login-user interface 1000 that may be displayed on the personal-mobile device where the login-user interface includes an accept user-selectable option 1010 (e.g., a soft button operable on a touch interface of the personal-mobile device) and a deny user-selectable option 1020 (e.g., another soft button). The accept user-selectable option provides for the user to accept login to the account without entering the password in the login-user interface. Receipt of a selection of the accept user-selectable option in the login-user interface is a user verification that the user, via computer 410, would like to login to the account. The selection of the accept user-selectable option may be the user-verification information for the user verification. The user' password and/or other information used by the personal-identity server to authenticate the identity of user and/or the identity of the personal-mobile device may be stored in the personal-mobile device and may be transmitted to the identity server if the accept user-selectable option is selected. The user's password or the like may be stored in a substantially secure location (e.g., in password protected location) on the personal-mobile device. The user's password or the like might also be stored in the user's personal-mobile device in an encrypted format. Password protecting the user's password and/or encrypting the user's password inhibits a fraudulent user from accessing the user's password if the fraudulent user accesses the personal-mobile device. If the user selects the accept user-selectable option, the mobile-authentication application is configured to direct the personal-mobile device to send an authentication communication to the personal-identity server. The preceding described authentication communication step is substantially similar to step 745 described above.

According to another embodiment of the present invention, a plurality of personal devices that may be personal to a user is configured for use by computer system 400 as one or more security tokens for logging into the account with the service offered by application server 430. As described above, personal objects are objects that a user typically has under her exclusive control. The plurality of personal devices may include a personal-smart card 480 (see FIG. 4) and personal-mobile device 420. The personal-smart card and the personal-mobile device may be personal objects of the user. A computerized method that provides for the use of a plurality of personal devices provides relatively high authentication security for assuring that the user who holds the account with the application server is not a fraudulent user attempting to gain fraudulent access to the account. For example, if a plurality of personal devices is required for logging into the account, it is unlikely that a fraudulent user would acquire each of the personal devices required for login. For example, if the personal-mobile device and the personal-smart card are configured for combined use as security tokens for login to the account, it is relatively unlikely that a fraudulent user could acquire both the personal-mobile device and the personal-smart card because these personal devices may be carried on different parts of the user's person. For example, if a fraudulent user steels (e.g., by picking the user's pocket) the user's wallet and acquires the personal-smart card, it may be unlikely that the fraudulent user may also steel the personal-mobile device. Similarly, if a fraudulent user steels the user's personal-mobile device (e.g., from a table, a car, etc.), it may be unlikely that the fraudulent user would also steel the user's wallet and acquire the personal-smart card. Because there is a relatively low likelihood for a fraudulent user to acquire the plurality of the personal devices configured for use as security tokens by computer system 400, the likelihood that a fraudulent user may gain access to the account may also be relatively low. The likelihood of fraudulent access to the user's account may be relatively lower by providing that the personal devices configured for use as security tokens are different types of personal device typically carried on different areas of the user body or typically kept in different locations.

According to one embodiment, the personal-identity server is configured to register personal-smart card 480 with the personal-identity server. The personal-identity server may be configured to register the personal-smart card similarly to the personal-mobile device as described above. For example, the personal-identity server may provide an option within a user's personal-identity account for registering the personal-smart card. The example webpage shown in FIG. 5 includes a user selectable option for registering the personal-smart card. The personal-smart card may be registered with the personal-identity server via interaction of the personal-smart card with the personal-mobile device, which may be previously registered with the personal-identity server, or via interaction of the personal-smart card with computer 410, or via other methods. For example, the personal-mobile device and/or the computer maybe configured to read the personal-smart card and send unique-identifying information for the personal-smart card to the personal-identity server to register the personal-smart card.

According to one embodiment, the user's personal-mobile device and the user's personal-smart card are used by computer system 400 in combination as security tokens for securely allowing the user, via computer 410, to login to the account held with the service provided by the application server. For example, if the personal-mobile device receives a communication from the personal-identity server (e.g., via the messaging-service server) requesting verification that the user, via computer 410, would like to login to the account (e.g., step 730), then the mobile-authentication application may require that the personal-mobile device read the personal-smart card's unique-identifying information from the personal-smart card prior to sending an authentication communication to the personal-identity server for verification of the identity of the user (e.g., verify the user's password), verify the identification information for the personal-mobile device, and/or verify the personal-smart card's unique-identifying information. In addition to the personal-mobile device being required to read unique-identifying information from the personal-smart card, the mobile-authentication application operating on the personal-mobile device may also request that the user enters the user's password to effect login to the account. If the unique-identifying information for the personal-smart card is not read by the personal-mobile device, then the personal-mobile device may be configured to not send the authentication communication to the personal-identity server and may be configured to inform the user that the requested information for login to the account has not been fully entered in the mobile-authentication application. Those of skill in the art will be aware of numerous methods by which the personal-mobile device and the computer may be configured to collect the unique-identifying information from the personal-smart card, and therefore, such methods are not described herein. Presentation of the personal-smart card to the personal-mobile device by the user (regardless of the method by which the personal-mobile device reads the personal-smart card) for reading the personal-smart card's unique identifying information and/or receipt of the unique identifying information may be a user verification of the user for accepting login to the account via the personal-mobile device. In the presently described embodiment, the personal-smart card's unique identifying information may be a portion of the user-verification information for login to the account.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, the personal-identity server may be operated according to a number of personal identification standards, such as the OpenID™ standard of the OpenID™ Foundation, or other standards. Therefore, based on the above disclosure and the following claims, other arrangements, embodiments, implementations and equivalents will be evident to those skilled in the art and may be employed without departing from the spirit and scope of the invention as defined by the claims.

What is claimed is:

1. A computerized method comprising:
   receiving at a personal-mobile device a first communication, which includes information for requesting user verification for logging into an account of a user, via a computing device, wherein the account is with a service provided by an application server;
   starting a personal-authentication application on the personal-mobile device in response to receiving the first communication;
   receiving in the personal-authentication application a user verification for confirming logging into the account;
   receiving in the personal-authentication application a unique identifier from a personal-smart card for confirming logging into the account via the computing device, wherein the personal smart card and the personal-mobile device are separate devices; and
   logging into the account via the computing device based on receipt of the user verification and the unique identifier.

2. The computerized method of claim 1, further comprising displaying by the personal-authentication application on the personal-mobile device a login-user interface configured to accept user-verification information for the user verification for logging into the account, wherein the step of receiving in the personal-authentication application the user verification includes receiving in the login-user interface the user-verification information for confirming logging into the account via the computing device.

3. The computerized method of claim 2, wherein the user-verification information includes a user ID and/or a password for the user of the personal-mobile device.

4. The computerized method of claim 3, further comprising transmitting an authentication communication from the personal-mobile device to a personal-identity server, wherein the authentication communication includes user-verification information for the user verification and unique identifier for logging into the account.

5. The computerized method of claim 4, further comprising verifying as authentic at the personal-identity server an identity of the user, if a credential in the user-verification information matches a credential in a personal-identity account of the user held with the personal-identity server.

6. The computerized method of claim 1, further comprising transmitting an authentication communication from the personal-mobile device to a personal-identity server, wherein the authentication communication includes user-verification information for the user verification for logging into the account.

7. The computerized method of claim 6, further comprising verifying as authentic at the personal-identity server an identity of the user, if a credential in the user-verification information matches a credential in a personal-identity account of the user held with the personal-identity server.

8. The computerized method of claim 7, further comprising transmitting from the personal-identity server to the application server a login credential for logging into the account, if the user if verified as authentic.

9. The computerized method of claim 8, wherein the login credential is a signed token.

10. The computerized method of claim 6, wherein the user-verification information includes a user ID and/or password for the user.

11. The computerized method of claim 2, further comprising:
    receiving via a login webpage on the computing device a login request for the account; and
    transmitting an authentication request from the application server to the personal-identity server to collect a login credential of the user for logging into the account.

12. The computerized method of claim 2, wherein the step of receiving at the personal-mobile device the first communication, includes receiving the first communication from a personal-identity server at the personal-mobile device.

13. The computerized method of claim 12, wherein the step of receiving at the personal-mobile device the first communication, includes receiving the first communication from the personal-identity server through a messaging-service server at the personal-mobile device.

14. A computerized method comprising:

receiving at a personal-identity server an authentication request from an application server for user login to an account for a service provided by the application server, wherein the user login to the account is via a computing device;

transmitting from the personal-identity server to a personal-mobile device a request for user verification for the user login into the account;

receiving at the personal-identity server user verification information for confirming the user login to the account from the personal-mobile device via a personal-authentication application executed on the personal-mobile device in response to the request;

receiving at the personal-identity server a unique identifier retrieved through the personal-mobile device from a personal-smart card for confirming logging into the account via the computing device, wherein the personal-mobile device and the personal-smart card are separate devices;

receiving at the personal-identity server an authentication communication, comprising the user verification information and the unique identifier, from the personal-mobile device;

verifying as authentic at the personal-identity server an identity of the user based on the authentication communication, if a credential in the user-verification information matches a credential in a personal-identity account of the user held with the personal-identity server; and transmitting from the personal-identity server to the application server a login credential for the user login to the account via the computing device if the user if is verified as authentic.

15. The computerized method of claim 14, further comprising:

receiving at the personal-mobile device the request for the user verification for the user login to the account;

starting the personal-authentication application on the personal-mobile device in response to receiving the request;

receiving in the personal-authentication application the user verification for confirming the user login to the account; and transmitting from the personal-mobile device to the personal-identity server the authentication communication in response to receipt of the user verification in the personal-authentication application.

16. The computerized method of claim 15, further comprising:

displaying by the personal-authentication application on the personal-mobile device a login-user interface configured to accept information for receiving user verification for logging into the account via the computing device;

receiving in the login-user interface a user verification for confirming logging into the account via the computing device; and logging into the account via the computing device based on receipt of the user verification in the login-user interface.

17. A system configured to login to an account for a network-provided service comprising:

a computing device configured for login to an account for a service;

an application server configured to provide the service for the account to the computing device across a network;

a personal-mobile device configured as a security token for login to the account; and a personal-identity server configured to:

receive an authentication request from an application server for user login to the account;

transmit to a personal-mobile device a request for user verification for the login to the account;

receiving an authentication communication from the personal-mobile device wherein the authentication communication includes user-verification information of the user entered in the personal-mobile device and a unique identifier read from a personal-smart card for confirming logging into the account via the computing device, wherein the personal-mobile device and the personal smart card are separate devices;

verify as authentic an identity of the user based on the authentication communication credentials in a personal-identity account of the user held with the personal-identity server; and transmit to the application server a login credential for the user login to the account if the user if verified as authentic, and wherein the application server is configured to login the computing device to the account based on receipt of the login credential.

18. The system of claim 17, further comprising a messaging-service server configured to relay the request for the user verification from the personal-identity server to the personal-mobile device.

19. The system of claim 17, wherein the personal-mobile device is a mobile telephone.

* * * * *